Patented Oct. 27, 1942

2,300,131

UNITED STATES PATENT OFFICE 2,300,131

LUBRICANT

Louis A. Mikeska, Westfield, N. J., assignor to Standard Oil Development Company, a corporation of Delaware No Drawing. Original application September 29, 1937, Serial No. 166,332. Divided and this application September 24, 1940, Serial No. 358,085

9 Claims. (Cl. 252—57)

The present invention relates to improved pour point depressants for use in waxy lubricating oils and to wax modifying agents which are used in the process of separating waxy materials from oils. The invention will be fully understood from the following description.

Wax modifying agents are produced in many ways and are used for controlling or favorably improving crystal formation or rate of crystal growth so as to reduce the pour or solidification point of waxy lubricating oils. They are also used to assist in the separation of wax from mineral or other oils which have been diluted with wax precipitating agents.

The present invention relates to a new type of modifying agent which can be made cheaply from easily available raw materials. The product is produced by polymerization of phenolic esters of unsaturated or halogenated fatty acids. The compounds which are used are those which have a relatively long chain of carbon atoms which may be present in the acid or in the phenol as an alkyl group. When a long chain acid is used an alkylated or an unalkylated phenol is to be used but when a short chain acid is employed (less than say at least 8 or 10 carbon atoms) only the alkylated phenolic compounds are useful and these should have an alkyl group of at least 8 to 10 carbon atoms.

Various phenolic esters may be used, for example the esters of phenol itself, or of mono or di-alkyl phenols such as cresols, xylenol thymol, and the like. Similarly polyhydroxy phenolic esters may be employed such as the esters of di and tri-hydroxy phenols, for example, esters of resorcinol, pyrogalol and the like, but it is preferred not to use materials with more than three of the carbon atoms of the benzene ring containing substituent groups.

The naphthol and alkylated naphthol esters also may be used in exactly the same way as the simple phenolic esters disclosed above.

As to the various acids which may be used, it is preferred to use straight chain aliphatic acids of the types found in fatty oils derived from vegetable and animal sources. Acids should of course, contain some suitable reactive group in their chains, for example an unsaturated linkage or one or more halogen atoms capable of reaction with an aromatic ring or inter alia with themselves. As examples of these types of materials, oleic acid may be mentioned as well as mono or dichlor stearic acids. If saturated fatty acids are available, it is preferred to halogenate them by the direct addition of chlorine and the treatment may be accomplished by passing free chlorine through the acid which is contained in liquid condition. This treatment may be accomplished on the acid itself or on the phenolic ester thereof. As indicated above short chain unsaturated acids or halogenated acids may be used in esters made from phenolic substances having relatively long alkyl groups but long chain length acids may be employed with alkylated or unalkylated phenolic esters.

Polymerization is brought about by suitable catalytic agents of the type capable of effecting alkylation of aromatic rings. The most suitable of these types are the Friedel-Crafts catalysts such as aluminum chloride, zinc chloride, boron fluoride and the like. The temperature of reaction may vary over quite a wide range from room temperature up to say 300° F., for example, or perhaps somewhat higher, although it is preferred to maintain the temperature in the lower range given and to prevent decomposition. The ester may be condensed in absence of any diluent or solvent or the reaction may be brought about in the presence of suitable solvents such as saturated naphthas, carbon disulfide or polychlor hydrocarbons preferably of less than 4 carbon atoms such as trichlor ethylene, tetrachlor ethylene or tetrachlor ethane. It is sometimes desirable to add chlorinated paraffin wax to the ester undergoing polymerization. The time of reaction varies considerably with temperature and with the other reaction conditions and may be from two to three hours or more. It is preferred to agitate the reaction mixture strongly during the period of catalyst addition and the polymerization. After the reaction the catalyst is hydrolyzed by the addition of alcohol or water and the products of hydrolysis of the catalyst may be removed either by settling, filtration or other suitable mechanical means. The solvent and the unpolymerized materials are removed by distillation with fire and steam or under vacuum and the residue collected is the wax modifying agent desired.

The reaction which takes place is obscure at the present time, but it is believed to be a condensation of two or more molecules of the phenolic ester because the molecular weight is considerably increased during the reaction. The product may be finished in any desired manner, for example with a limited treatment with clay, and is added to waxy oils in proportion usually less than about 5% in order to reduce the pour point. Different waxy oils are characterized by considerably different susceptibilities to pour point depressors and the necessary amount of the depressant to obtain a given reduction in pour point may vary in some cases from as little as 0.1% up to say 5%.

When the wax modifying agent is used as a wax separation aid, it is added in substantially the same proportions and the oil to be dewaxed is diluted with a suitable dewaxing solvent, for example a naphtha or a liquefied normally gaseous hydrocarbon such as propane or butane. Oxygen-containing solvents such as the lower molecular weight alcohols and ketones may also be employed, but preferably in the presence of naphtha or benzol or some other hydrocarbon solvent. Chlorinated dewaxing agents and mixtures of the same, such as are now used in the arts, may also be employed. When the wax modifying agent is present, it is found that the diluted oil may be chilled relatively rapidly and separation accomplished either by gravity settling, filtration or centrifugation. In any case, a denser wax is produced which will settle rapidly from the diluted oil.

As an example of the manufacture of the new pour point depressant and its use, the following example may be considered:

*Example I*

Phenyl oleate was prepared by mixing equimolal proportions of phenol and oleic acid. The mixture was then taken up in xylol and a few drops of a concentrated sulfuric acid added. This mixture was then heated for a considerable period under a reflux condenser, the temperature of which was adjusted just below the boiling point of xylene, so as to allow the water produced in the esterification to escape while the xylene was returned to the flask. The ester produced in this way was then washed with water and distilled under vacuum for further purification.

To 70 grams of phenyl oleate, produced as above, were added 150 cc. of tetrachlor ethane and when the mixture was complete 7 grams of anhydrous aluminum chloride were added slowly. The temperature was maintained at about room temperature and the mixture was vigorously agitated during the addition of the catalyst. It was then allowed to stand with occasional agitation for about 24 hours.

The product obtained at the end of this time was poured into aqueous alcohol (20% alcohol) and this mixture was extracted with kerosene. The extract was washed with water and was then distilled with fire and steam to a temperature of 570° F., which was sufficient to remove most of the kerosene together with most of the unreacted phenyl oleate.

The product recovered amounted to 52 grams. When 3% of this material was added to a waxy lubricating oil, which had an original pour point of 30° F., the pour point was found to be reduced to 5° F.

This application is a division of application Serial No. 166,332, filed September 29, 1937, now issued as Patent No. 2,239,533 of April 22, 1941.

The present invention is not to be limited to any theory of the mechanism of the reaction by which the modifying agent is prepared nor to any particular ester, but only to the following claims in which it is desired to claim all novelty inherent in the invention.

I claim:

1. A hydrocarbon oil and a small amount of a polymer of a reactive-group-containing fatty acid ester of an aromatic hydroxy compound, said ester containing more than 10 aliphatic carbon atoms.

2. Composition according to claim 1 in which the polymer is obtained from a phenolic ester of a long chain unsaturated acid.

3. Composition according to claim 1 in which the polymer is a polymer of phenyl oleate.

4. Composition according to claim 1 in which the polymer is a polymer of a phenyl ester of a halogenated acid.

5. Composition according to claim 1 in which the polymer is a polymer of a phenolic ester of a chlorinated aliphatic acid.

6. Composition according to claim 1 in which the polymer is a polymer of phenyl chlor stearic acid.

7. An oil composition comprising interlinked ester molecules, acting as a wax modifying agent, which are produced by the action of a catalyst suitable for polymerizing and condensing reactions on an ester of a hydroxy aromatic and fatty acid, the fatty acid radical in said ester containing a reactive group for the interlinking of the ester molecules.

8. An oil composition according to claim 7, in which said interlinked ester molecules are blended as a wax modifier with a waxy lubricating oil.

9. A lubricant comprising a major proportion of a waxy mineral lubricating oil and 0.1% to 5.0% of a pour depressor made by polymerizing phenyl oleate in the presence of aluminum chloride as catalyst at a temperature between the approximate limits of room temperature up to about 300° F., hydrolyzing and removing residual catalyst, extracting the reaction products with kerosene and distilling the kerosene extract with fire and steam to a temperature of about 570° F. to remove kerosene and unreacted phenyl oleate, leaving the desired pour depressor as distillation residue.

LOUIS A. MIKESKA.